No. 768,451. PATENTED AUG. 23, 1904.
J. HEDLUND.
FISH HOOK.
APPLICATION FILED FEB. 5, 1904.
NO MODEL.
FIG. 1.  FIG. 2.  FIG. 3.
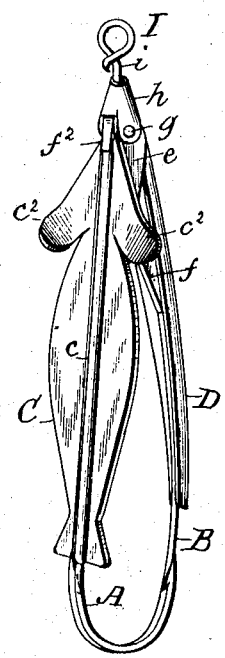 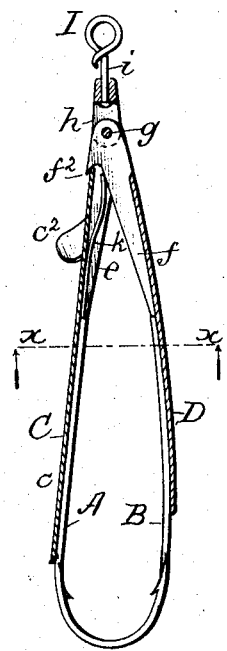 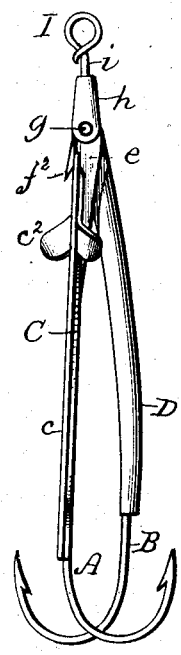
FIG. 4.
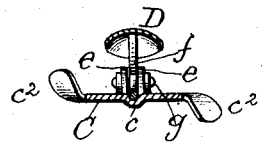
WITNESSES:
Harry L. Amer.
H. H. Masson
INVENTOR
John Hedlund
BY E. E. Masson
Attorney No. 768,451.

Patented August 23, 1904.

UNITED STATES PATENT OFFICE.

JOHN HEDLUND, OF ST. CLOUD, MINNESOTA.

FISH-HOOK.

SPECIFICATION forming part of Letters Patent No. 768,451, dated August 23, 1904.

Application filed February 5, 1904. Serial No. 192,165. (No model.)

*To all whom it may concern:*

Be it known that I, JOHN HEDLUND, a citizen of the United States, residing at St. Cloud, in the county of Stearns and State of Minnesota, have invented certain new and useful Improvements in Fish-Hooks, of which the following is a specification.

This invention relates to duplex fish-hooks which are adapted to be trolled through weeds and grass without coming in engagement with them; and the objects of my invention are to obtain fish-hooks of this class which are simple and durable in construction and provided with a concavo-convex spoon on the shank of one of the hooks and upon the other hook with a substantially flat plate having the outline of a minnow, with propeller-like blades adjacent to its head, the whole suspended from a swivel which permits its rotations.

I attain these objects by the construction illustrated in the accompanying drawings, in which—

Figure 1 is a perspective view of a duplex hook constructed in accordance with my invention. Fig. 2 is a longitudinal section of the same in its normal condition. Fig. 3 is a side view of the same with the points of the hooks separated as when a fish has taken the hooks and compressed their shanks toward each other. Fig. 4 is a transverse section of the device on line $x$ $x$ of Fig. 2.

In said drawings, A represents the shank of one of the hooks, and B the shank of the other hook. The shank A is soldered or otherwise secured to a thin sheet of bright metal C, which is cut on the outline of a minnow or other fish or bait, said metal sheet being bent lengthwise to form on its inner side a groove $c$ for the reception of said shank A. The shank B of the other hook is soldered to the concave inner side of a long but narrow spoon D, of bright sheet-metal, approximately resembling the belly of a minnow. The upper end of the plate C is provided on its inner side and parallel with its axis with two ribs $e$ to form members of a hinge, and the upper end of the spoon D is provided on its inner side with a central rib $f$, which is made to enter between the ribs $e$ and constitute the other member of a hinge. A pin $g$, passing through the ribs $e$ and $f$, forms the pivot $g$ of the two branches of the duplex hook. Over the upper end of said branches and straddling them is placed a clevis $h$, which also receives the pivot-pin $g$.

To obtain a swivel from said clevis, its upper end is axially perforated and receives a headed wire $i$, which passes loosely through the perforation, the upper end of said wire being bent over and twisted to form an eye or loop I, to which one end of a fish-line can be attached.

To cause the hooks to be normally lying alongside of each other, as shown in Figs. 1 and 2, a spring $k$, consisting of a slightly-bent wire, preferably of springy brass, has its lower portion soldered or otherwise secured to the inner face of the plate C between its two ribs $e$, and its upper portion bears against the rib $f$ of the narrow spoon D.

To prevent the hooks A B from being forced inwardly too much by the spring $k$, the upper portion of the rib $f$ is provided with a latch-like pointed projection $f^2$, which projects through a slot in the upper end of the plate C and has its under side bearing upon the edge at the lower end of said slot. The same result is also obtained by having the end of the hook B bearing against the tail end of the plate C.

To cause the duplex hooks to rotate when trolled through water, the head of the plate C is provided with blades $c^2$, which project laterally from said plate and have their ends slightly bent in opposite directions.

Having now fully described my invention, I claim—

1. In duplex fish-hooks the combination of the shank of a hook and a bait-representing plate attached thereto, the shank of another hook and a concavo-convex spoon attached thereto, said plate and spoon being hinged together, and a spring secured to one of said hinged members and pressing against the inner side of the other.

2. In duplex fish-hooks the combination of the shank of a hook and a thin plate attached thereto, with two parallel ribs projecting from said plate, the shank of another hook, a concavo-convex spoon attached thereto and a rib projecting centrally from said spoon, the ribs of the plate and spoon being hinged together, and a spring secured to the plate between the ribs, pressing against the central rib of the spoon.

3. In duplex fish-hooks the combination of the shank of a hook and a thin plate attached thereto having a slot in its upper end with two parallel ribs projecting from said plate, the shank of another hook, a concavo-convex spoon attached thereto and a rib projecting centrally from said spoon, the upper portion of said rib having a pointed projection to bear upon the lower edge of the slot of the thin plate, the ribs of the plate and spoon being hinged together, and a spring secured to the plate pressing against the central rib of the spoon.

4. In duplex fish-hooks the combination of the shank of a hook, and a thin plate attached thereto having on its upper end lateral blades and two parallel ribs, the shank of another hook, a concavo-convex spoon attached thereto and a rib projecting centrally from said spoon, the ribs of the plate and spoon being hinged together, a spring secured to the plate and pressing against the spoon, a clevis straddling the ribs of the plate and spoon, a pivot-pin passing through them, and a headed and looped wire passing through the clevis, substantially as described.

In testimony whereof I affix my signature in presence of two witnesses.

JOHN HEDLUND.

Witnesses:
G. H. OVERBECK,
A. L. RILEY.